Jan. 2, 1951 K. H. EMERSON 2,536,801

SUPERREGENERATIVE RECEIVER

Filed March 2, 1946 2 Sheets-Sheet 1

INVENTOR.
KENNETH H. EMERSON
BY
[signature]
AGENT

Jan. 2, 1951 K. H. EMERSON 2,536,801

SUPERREGENERATIVE RECEIVER

Filed March 2, 1946 2 Sheets-Sheet 2

INVENTOR.
KENNETH H. EMERSON
BY Reynolds D. Brown
AGENT

Patented Jan. 2, 1951 2,536,801

UNITED STATES PATENT OFFICE 2,536,801

SUPERREGENERATIVE RECEIVER

Kenneth H. Emerson, Philadelphia, Pa., assignor, by mesne assignments, to Philco Corporation, Philadelphia, Pa., a corporation of Pennsylvania Application March 2, 1946, Serial No. 651,649

1 Claim. (Cl. 250—20)

Figure 1:
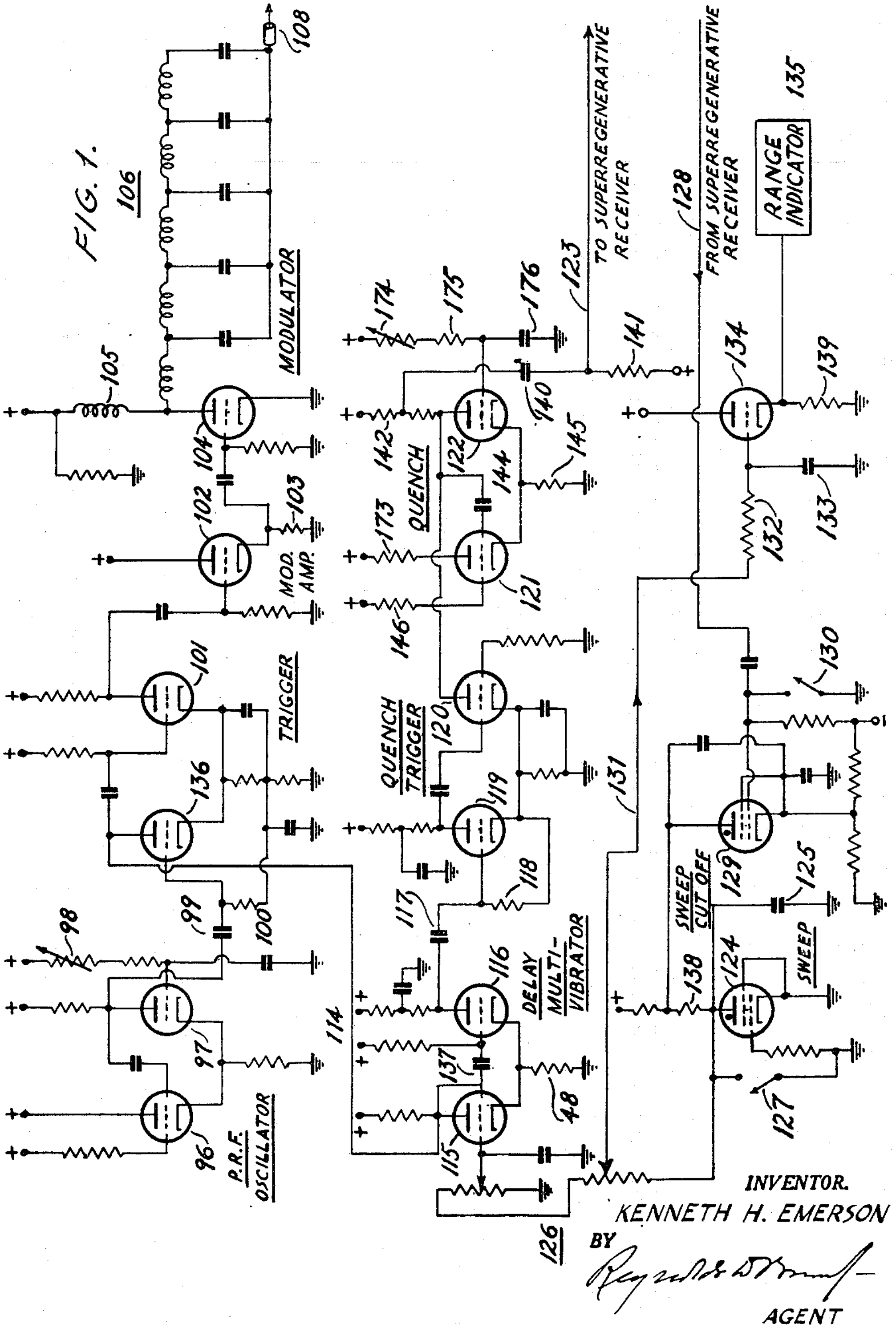

This invention relates to improved electrical apparatus for automatically controlling the regeneration of superregenerative radio receiver circuits. Although the invention is applicable to superregenerative receivers generally, I have found it to be particularly useful in superregenerative receivers employed in radio ranging systems, for effecting the maximum possible discrimination between desired signals and undesired noise. Accordingly, I shall find it convenient to describe the invention with reference to a particular class of radio ranging systems, in connection with which my novel circuit arrangement was conceived, while in no way limiting the invention to such application.

In the copending application of William E. Bradley, Serial No. 651,398, filed March 1, 1946, is described a radio ranging system in which a superregenerative receiver is unquenched during time-spaced intervals, the spacing of which is varied in a predetermined manner so as to render the receiver responsive to received signals produced by reflection of transmitted pulses from target objects at different ranges from the transmitting and receiving equipment. In such systems it is desirable to control the regeneration and thereby the sensitivity of the superregenerative receiver so as to secure the maximum possible discrimination between desired signals and undesired noise. This may be effected by developing in response to the output from the superregenerator a control signal which is used to control the sensitivity of the superregenerator. However, if, as indicated above, the superregenerator is unquenched only during time-spaced intervals, and if each unquenching coincides with the arrival of a received pulse signal, the sensitivity control signal developed will depend upon the magnitude of the received signal, so that there will be a tendency undesirably to reduce the sensitivity of the superregenerator. To obviate this difficulty, the superregenerator may be unquenched not only during intervals corresponding to the arrival of desired received signals, but also during other intervals between the arrivals of such desired signals. In this manner the sensitivity controlling signal developed in response to the output of the superregenerator is made to depend not only upon the output in the presence of desired received signals, but also upon the output in the absence of such signals but in the presence of noise. By making the number of unquenchings which occur in the absence of received signal substantially greater than the number which occur when a received signal is present, the resultant control signal can be made principally dependent upon the output of the superregenerator produced in response to noise alone. This permits the superregenerator to be controlled to an optimum level of sensitivity for maximum discrimination between desired signals and noise.

The principal object of the invention is to provide a novel and improved circuit arrangement for utilizing the control signal thus developed for controlling the regeneration and hence the sensitivity of the superregenerative amplifier.

Essentially the circuit arrangement according to the invention comprises a control tube having at least triode elements, whose plate and cathode are respectively connected to the plate and cathode of the superregenerative oscillator tube. The plates of the control tube and of the oscillator are both supplied with positive potential through a common impedance which is at least partially resistive. Means are then provided for deriving a control signal from the output of the oscillator during the intervals in which it is unquenched, and for applying this control signal to the grid of the control tube. Any tendency for variation in magnitude of the output of the superregenerative oscillator will then modify the control voltage applied to the grid of the control tube, and will therefore modify the plate voltage both of the control tube and of the oscillator, in such manner as to oppose the aforesaid variation in the output signal of the oscillator.

Figure 1A:
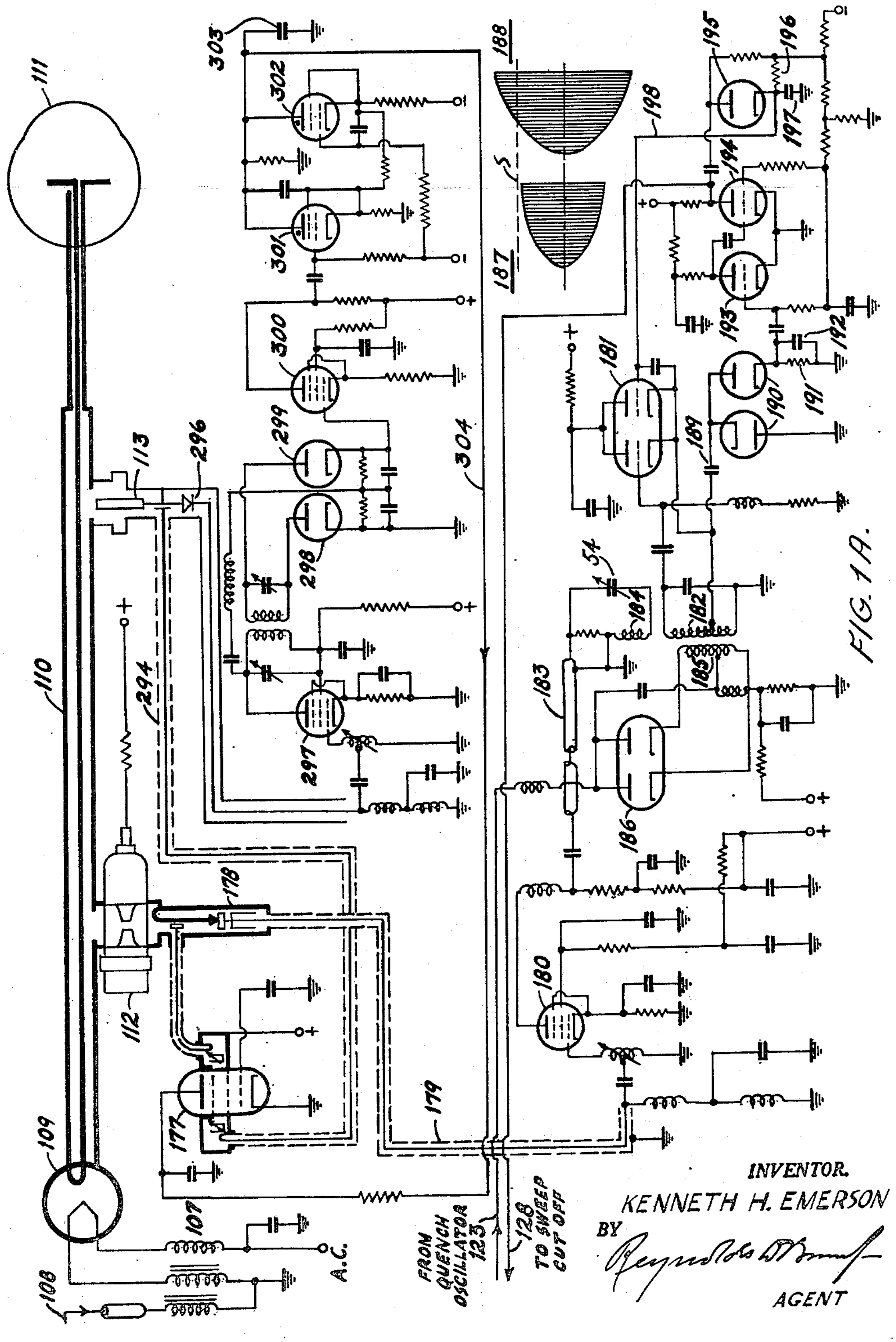

Other objects and features of the invention will become apparent from consideration of the following description and drawings, in which:

Figs. 1 and 1A, taken together, constitute a schematic diagram illustrating one form of a system embodying the invention.

The radio ranging and tracking system shown schematically in these figures is described generally, as to its overall operation, in copending application of William E. Bradley for Pulse Type Radio Range Tracking and Indicating System, Serial No. 651,398, filed March 1, 1946, and accordingly such operation requires but brief treatment here. In general, a pulse repetition frequency (P. R. F.) oscillator is employed to control the periodic transmission of pulses of high frequency energy, and a superregenerative receiver is used to receive the transmitted pulses after their reflection from target objects. The superregenerator is unquenched in response to pulses from a quench oscillator at intervals progressively and cyclically delayed, with respect to P. R. F. pulses, as determined by a cyclic control voltage. Upon the simultaneous occurrence of a received pulse and an unquench pulse, the cyclic control voltage, and hence the cyclic variation in delay of unquench pulses with respect to P. R. F. pulses, is interrupted, the value of the control voltage upon interruption comprising a suitable indication of target range. In addition to the unquenching immediately following each P. R. F. pulse, the superregenerator is unquenched a number of other times before the next P. R. F. pulse, the output of the superregenerator during unquench pulses being used to produce automatic regeneration control (ARC) of the superregenerator in accordance with the present invention, as described more fully hereinafter.

Referring now more specifically to the schematic Figures 1 and 1A, the pulse repetition frequency oscillator may be a cathode feedback multivibrator oscillator comprising triodes 96 and 97 together with their associated connections. This oscillator may be adapted to oscillate at a frequency of approximately 2,000 cycles per second as adjusted by the variable resistor 98. Its circuits should be designed for maximum frequency stability and to give a suitable rectangular wave shape. Although its frequency may vary somewhat this will not affect the operation of the other circuits in accordance with the invention. The negative pulse derived from the plate of tube 97 is supplied through a differentiating circuit comprising condenser 99 and resistor 100 to the grid of a trigger tube 136, the output of which will be a pulse corresponding to the trailing edge of the negative pulse derived from the plate of tube 97. This pulse is fed from the plate of tube 136 to the grid of a trigger amplifier tube 101 and thence to the grid of a cathode follower tube 102, from the cathode load 103 of which a corresponding pulse is supplied to the grid of modulator tube 104, which may be a type 3C45 gas tube. The cathode follower tube 102 is used to provide a low impedance drive for the gas tube modulator to avoid variations in the time of its triggering. In the output circuit of the modulator tube 104 is connected a resonant charging choke 105 tuned by the capacitors of delay line 106 which may have a characteristic impedance of approximately 50 ohms and whose input is connected to the plate of the modulator tube in the manner shown. A modulating pulse which may be of the order of 2,200 volts is developed across resonant choke 105 and is supplied, through delay line 106 for shaping purposes, to the primary winding of pulse transformer 107. Included in this connection may be a transmission line 108 having a characteristic impedance of approximately 50 ohms, since in practice magnetron 109, to which the secondary of the pulse transformer 107 is connected, will be located in a separate pressurized unit from the circuits heretofore described. Magnetron 109 may be a type 2J39 tube operating in S band with a peak power output of approximately five kilowatts. Pulsed microwave energy from magnetron 109 may be supplied through a section of stub-supported coaxial transmission line 110 to a suitable radiating and receiving antenna 111. At suitable points along line 110 may be located T—R cavity 112 and capacity probe 113 for signal take-off, the exact functions of which will be explained in further detail hereinafter.

Negative pulse signals at the pulse repetition frequency of 2,000 cycles per second are also supplied from the plate of trigger tube 136 to the plate of tube 115, which together with tube 116 and associated connections comprises a cathode feed-back, non-oscillatory multivibrator. The function of this multivibrator is to generate positive pulses of varying duration whose leading edges correspond to the trailing edges of negative pulses generated by the P. R. F. oscillator. Its mode of operation is generally as follows: The grid of tube 116 is normally biased more positive than the grid of tube 115 so as to cause tube 116 normally to conduct. It should be noted, however, that the bias on tube 116 is determined not only by the potential applied to its grid but also by the drop in the cathode resistor 48 during the time the tube is conducting. Tube 115, on the other hand, is normally cut off. Upon the occurrence of a negative pulse supplied to it through connection 114 from the plate of tube 136, the grid of tube 116 will be driven sufficiently negative to cut off the tube. When this happens the cathode of tube 115 as well as the cathode of tube 116 will be reduced to ground potential and tube 115 will begin to conduct. The current drawn by tube 115 will of course depend upon the bias applied to its grid from potentiometer 126. As tube 115 begins to conduct its plate will go negative and apply a negative impulse to the grid of tube 116 to maintain it cut off. However this effect will gradually be overcome, as condenser 137 charges through tube 115, until a point is reached at which tube 116 again conducts. The circuit is then in condition to repeat its cycle in response to the next pulse supplied from the trigger tube. The duration of pulses generated by this delay multivibrator will be variable, depending upon the grid bias on tube 115, from 1 to 14 microseconds. From these varying width delay pulses a differentiated signal is derived across the resistor 118 of a differentiating circuit comprising this resistor and condenser 117, and the negative pulses, corresponding to the trailing edges of the variable width pulses from the delay multivibrator, are supplied to the grid of tube 119, which together with tube 120 and associated connections comprises an amplifier for this pulse. The output of this amplifier is fed to the plate of tube 122 which, together with tube 121 and associated connections, comprises a freely oscillating cathode feed-back multivibrator adjusted to oscillate at a frequency somewhat below the 5th harmonic of the pulse repetition frequency oscillator (e. g. 9.8 kc.). The negative pulse supplied to this oscillator from the preceding amplifier serves to synchronize it by initiating a series of pulses at the 9.8 kc. rate, the initial pulse of this series being made to coincide exactly with the trailing edge of the variable duration pulse generated by the delay multivibrator. These generated pulses are differentiated in a network comprising condenser 140 and resistor 141 and the negative pulses, resulting from differentiation of their leading edges, are applied through connection 123 to unquench a superregenerative receiver whose circuits and mode of operation will be described in further detail hereinafter.

As aforementioned the widths of pulses generated by the delay multivibrator are determined by the voltage applied to the grid of tube 115 through voltage divider 126 from sweep tube 124. The latter may consist of a type 2D21 gas tube, between the plate of which and ground is connected a condenser 125. The other constants of this circuit are adjusted so that the sweep tube will normally develop across condenser 125 a saw-tooth voltage having a recurrence frequency of approximately 10 cycles per second. This voltage causes the potential on the grid of tube 115 of the delay multivibrator to vary, thereby varying the duration of the pulses generated by the delay multivibrator from 1 to 14 microseconds 10 times per second. There may also be provided between the plate of tube 124 and ground a switch 127 which, when closed will discharge the condenser 125 at any arbitrary time and reinitiate the sweep. This switch is referred to as an in-switch and its purpose is to permit the re-initiation of the sweep at any desired time in order to pick up a new target. In the absence of any received, reflected signal, the sweep tube will cause the delay multivibrator continually to sweep through the range of pulse widths from 1 to 14 microseconds, corresponding to ranges of from 165 to 2300 yards. However a sweep cut-off tube 129, which may also be a type 2D21 gas tube, is connected in shunt with condenser 125 and is supplied through connection 128 with pulses from the superregenerative receiver output, corresponding to received, target-reflected signals, to discharge the condenser 125 by a predetermined amount determined by resistor 138 whenever such a pulse is received. The amount by which the condenser 125 is discharged by such a pulse is made such that the voltage to which the grid of tube 115 of the delay multivibrator is reduced corresponds to a delay somewhat less than the time actually required for the preceding reflected signal to be received from the target. This is to take account of any diminution of the distance from the equipment to the target. There may also be provided an out-switch 130, connected between the grid of tube 129 and ground, which, when momentarily closed, will prevent a given received signal from actuating the sweep cut-off tube, thereby permitting the sweep voltage to continue rising, the width of the delay pulse to increase further, and the system to search for and ultimately lock on a more distant target. A range signal proportional to the peak voltage across condenser 125 may be derived directly from divider 126 and supplied through connection 131, and an integrating circuit comprising resistor 132 and condenser 133, to the grid of tube 134. The output from this tube, derived across a cathode load impedance 139, may be supplied to a suitable range indicator 135.

There will now be explained in detail the operation of the superregenerative receiver, and its associated circuits. Received, target-reflected signals derived from T-R box 112 are mixed with a signal from local oscillator 177 in crystal mixer 178 and the resulting intermediate frequency is supplied therefrom through transmission line 179 to the input of buffer preamplifier tube 180. It is to be noted that the primary function of this tube is to prevent radiation through the antenna 111 of signal from the superregenerator and that, except for this requirement in certain military applications, the tube might be omitted inasmuch as sufficient amplification is provided by the superregenerator alone. In order accurately to maintain the frequency of the local oscillator 177, which may comprise a type 2K28 klystron, an automatic frequency control circuit is employed. To this end, received signals derived from another point on transmission line 110 by means of capacity probe 113 are mixed in crystal mixer 296 with local oscillator signal supplied through connection 294. The resulting signal is amplified in a suitable intermediate frequency amplifier 297 and supplied to a conventional discriminator comprising tubes 298 and 299 and associated circuits. From the output of the discriminator are derived positive or negative pulses, the polarity of which will depend upon the relation between the transmitter and local oscillator frequencies as compared to the intermediate frequency tuning of the discriminator. These pulses are amplified in the pulse amplifier tube 300 and are supplied from the output thereof to the grid of a gas discharge tube 301. The latter is connected in shunt with a second gas discharge tube 302 which, together with condenser 303, constitutes a sawtooth oscillator which may be adjusted to operate at a low frequency of, for example, 5 cycles per second. The voltage developed across condenser 303 is supplied through connection 304 to the repeller of local oscillator tube 177 to vary its frequency through a range comprising those frequencies which, when mixed with frequencies within the range at which the transmitter might operate, will yield the desired intermediate frequency. Thus the gas tube oscillator will tend to sweep the frequency of the local oscillator 177 through this range 5 times per second. However the positive pulses from the pulse amplifier 300, appearing on the grid of tube 301, will cause it to conduct whenever the frequency of the transmitter exceeds the frequency to which the discriminator is tuned. This will discharge condenser 303 by a certain amount so as to tend to maintain the voltage thereacross, and hence the frequency of local oscillator 177, constant.

The left hand triode section of tube 181, together with tank circuit 182, comprise a superregenerative oscillator which may be adjusted to operate at a frequency in the neighborhood of 60 megacycles. Pulses of intermediate frequency energy corresponding to target signals will be supplied to tank circuit 182 through connection 183 and an inductor 184 coupled to the tank circuit inductance. Unquenching pulses at the quench oscillator rate of 10 kilocycles, and variably delayed with respect to transmitted pulses from the P. R. F. oscillator, will also be supplied through connection 123 to a damping circuit comprising double diode 186 and inductor 185 coupled to the inductor of tank circuit 182. As heretofore explained these unquenching pulses have been steepened and narrowed to a width of approximately one-half microsecond by means of the differentiating network 140, 141. Since the unquenching pulses occur at a higher frequency than the received target pulses, received signals will not be present in the tank circuit 182 upon the occurrence of every unquench pulse. In the presence of received signals oscillations in the tank circuit 182 will build up more rapidly, and to a higher level during the unquench interval, than in their absence. This difference between absence and presence of signal is shown at 187 and 188 respectively. The rate of build-up of oscillations may be adjusted so that, in the absence of received signal, they will not build up during the unquench interval beyond the level S, while, in the presence of received signal, they will build up appreciably beyond level S. This adjustment is conveniently made by adjustment of the coupling between inductors 184 and 182 and by adjustment of the tuning of the circuit comprising inductor 184 and condenser 54 to differ somewhat from the resonant frequency of tank circuit 182. It will be apparent also that the duration of the unquench interval is an important factor in controlling the difference between the output of the superregenerator in the presence and in the absence of received signal. As already mentioned the duration of this interval can readily be controlled by differentiating or otherwise narrowing the pulses generated by the quench oscillator multivibrator. To distinguish between the output of the superregenerator with and without received signals, there was utilized, in this embodiment of the invention, a cycle counter comprising condenser 189, a pair of diodes 190, resistor 191 and condenser 192. One of the diodes has its plate connected to one side of condenser 189 and its cathode connected to ground through a load impedance comprising resistor 191 and condenser 192. The other has its cathode connected to the same side of condenser 189 and its plate connected to ground. Condenser 189 may have a relatively small capacitance of the order of 15 micromicrofarads, while condenser 192 may be of the order of 100 micromicrofarads and resistor 191 of the order of 100,000 ohms. On each positive cycle of the superregenerative oscillator which exceeds the predetermined amplitude level S the two condensers will be charged through the right-hand diode, while on the negative cycle the other diode will discharge condenser 189 without affecting the charge on condenser 192, thus a voltage will be developed across condenser 192, the ultimate magnitude of which will be determined by the number and amplitude of the cycles of the superregenerative oscillator during the interval of unquenching. Clearly the magnitude of this voltage will be greater in the presence of a received signal than in its absence. This voltage is amplified in a pulse amplifier comprising tubes 193 and 194 and the output is supplied through connection 128 to the grid of sweep cut-off tube 129 to cause this tube to conduct whenever a target signal is received as hereinbefore explained.

The particular aspects of the system just described, to which the present invention relates, are the method of and means for controlling the sensitivity of the superregenerative receiver, comprising tube 181 and tank circuit 182, so as to insure the maximum discrimination between desired signals and undesired noise. By unquenching the superregenerative oscillator at a substantially higher frequency than the P. R. F. frequency, it is possible to utilize its no-signal output to operate an automatic regeneration control circuit for maintaining the desired sensitivity of the superregenerative receiver. To this end, output from the pulse amplifier is integrated by a peak detector comprising diode 195, resistor 196 and condenser 197. This peak detector may have a time constant of the order of 40 micro-seconds, which is approximately two-fifths of the interval between pulses of the quench oscillator. A time constant of this order of magnitude, which is long by comparison with the recurrence period of pulses from the quench oscillator and short compared to the intervals between received pulses, permits the peak detector output to return to its level in the absence of received signal following each received signal and prior to the occurrence of another. Thus there is no A. V. C. action and the output of the peak detector is not such as to impair the sensitivity of the superregenerator which it is to control. This output, after filtering, is applied through connection 198 to the grid of the other triode section of tube 181, whose plate is connected to the plate of the first section, and thus controls the rate of buildup of oscillations in the superregenerator.

Subject matter shown and described in this specification but not claimed herein is claimed in copending applications assigned to the assignee of the present invention as follows:

The following subject matter, in copending application of William E. Bradley, Serial Number 651,398, filed March 1, 1946:

(1) A radio ranging system employing a transmitter of time-spaced pulse signals, a producer of other time-spaced pulse signals normally delayed by varying time intervals with reference to said transmitter pulses, a receiver of object-reflected transmitted pulses, and means responsive to the simultaneous occurrence of received and produced pulses for substantially altering the delay of produced pulses with reference to transmitted pulses.

The following subject matter in copending application of Wilson P. Boothroyd and Albert L. Free, Serial Number 651,888, filed March 4, 1946:

(1) A radio ranging system employing a transmitter of time-spaced pulse signals, a producer of other time-spaced pulse signals normally delayed by varying time intervals with reference to said transmitter pulses, a receiver of object-reflected transmitted pulses, and means responsive to the simultaneous occurrence of received and produced pulses for altering the delay of produced pulses with reference to transmitted pulses in a manner to prevent another such simultaneous occurrence during a predetermined time interval.

(2) The representative embodiment of such a system employing a sweep circuit, comprising a gas tube and a condenser, and a separate gas tube for discharging the condenser by a predetermined amount upon the simultaneous occurrence of received and produced pulses, as shown and described with reference to Figures 1 and 1A of this specification.

(3) In a system of this sort, the method of and means for differentiating or otherwise narrowing and/or steepening quench pulses in order to achieve an appreciable difference between superregenerative receiver output in the presence and in the absence of received signal, as shown and described with reference to Figures 1 and 1A of this specification.

(4) In a system of this sort, methods of and means for modifying the operation thereof so as to cause the system to seek targets at either closer or greater range as shown and described with reference to Figure 1.

The following subject matter in copending application of Joseph C. Tellier, Serial Number 658,894, filed April 2, 1946:

(1) The cycle-counting arrangement, comprising a pair of diodes, for indicating the difference in output of a superregenerative receiver in the presence and in the absence of received signal, as shown and described with reference to Figures 1 and 1A of this specification.

The following subject matter in copending application of William E. Bradley, Serial Number 660,037, filed April 6, 1946:

(1) The quenching circuit for a superregenerative receiver, comprising a pair of diodes oppositely connected and coupled to the tank circuit of a superregenerative receiver, as shown and described with reference to Figure 1A of this specification.

I claim:

In a superregenerative receiver, a vacuum tube and a resonant tank circuit cooperating to form an oscillator, said vacuum tube having at least triode elements, a portion of said resonant tank circuit being connected between the grid and cathode of said vacuum tube and a portion of said tank circuit being included in the anode-cathode circuit of said vacuum tube, means for supplying input signal to said oscillator, means for deriving output signal from said oscillator, means for effecting alternate quenching and unquenching of said oscillator, a second vacuum tube having at least triode elements, said last-named vacuum tube having its anode and cathode respectively connected to the anode and cathode of said first-named vacuum tube, means responsive to the output from said oscillator for developing a control signal, and means for applying said control signal to the control grid of said last-named vacuum tube to control the rate of build-up of oscillations in said oscillator and thereby to control the sensitivity of said super-regenerative receiver.

KENNETH H. EMERSON.

REFERENCES CITED

The following references are of record in the file of this patent:

UNITED STATES PATENTS

| Number | Name | Date |
|---|---|---|
| 1,455,767 | Slepian | May 15, 1923 |
| 1,455,768 | Slepian | May 15, 1923 |
| 1,633,932 | Falknor | June 28, 1927 |
| 1,726,806 | Chapin | Sept. 3, 1929 |
| 2,147,595 | Hilferty | Feb. 14, 1939 |
| 2,189,549 | Hershberger | Feb. 6, 1940 |
| 2,398,214 | Emerson | Apr. 9, 1946 |
| 2,406,316 | Blumlein et al. | Aug. 27, 1946 |
| 2,406,371 | Hansen et al. | Aug. 27, 1946 |
| 2,414,992 | Wheeler | Jan. 28, 1947 |
| 2,422,382 | Winchel | June 17, 1947 |
| 2,429,513 | Hansen et al. | Oct. 21, 1947 |
| 2,431.344 | Reeves | Nov. 25, 1947 |